United States Patent [19]

Foster

[11] Patent Number: 4,896,761
[45] Date of Patent: Jan. 30, 1990

[54] RECIPROCATING CONVEYOR FLOOR MEMBERS AND SEALS

[76] Inventor: Raymond K. Foster, P.O. Box 1, Madras, Oreg. 97741

[21] Appl. No.: 357,084

[22] Filed: May 25, 1989

Related U.S. Application Data

[60] Continuation-in-part of Ser. No. 346,784, May 3, 1989, which is a continuation-in-part of Ser. No. 185,840, Apr. 25, 1988, Pat. No. 4,858,748, which is a division of Ser. No. 59,376, Jun. 4, 1987, Pat. No. 4,785,929, and a continuation-in-part of Ser. No. 680,069, Dec. 10, 1984, Pat. No. 4,679,686, which is a continuation-in-part of Ser. No. 346,865, Feb. 8, 1982, Pat. No. 4,492,303.

[51] Int. Cl.$^4$ ............................................. B65G 25/04
[52] U.S. Cl. ................................. 198/750; 414/525.1
[58] Field of Search .................... 198/750; 414/525.1, 414/525.9

[56] References Cited

U.S. PATENT DOCUMENTS

| | | | |
|---|---|---|---|
| 3,534,875 | 10/1970 | Hallstrom, Jr. | 214/83.3 |
| 4,144,963 | 3/1979 | Hallstrom | 198/750 |
| 4,184,587 | 1/1980 | Hallstrom | 198/750 |
| 4,492,303 | 1/1985 | Foster | 198/750 |
| 4,727,978 | 3/1988 | Hallstrom, Jr. | 198/737 |

Primary Examiner—Robert J. Spar
Assistant Examiner—D. Glenn Dayoan
Attorney, Agent, or Firm—Glenn D. Bellamy

[57] ABSTRACT

The present invention provides a reciprocating floor conveyor having floor members (10, 10') formed with a side lip (24, 26) overhanging either or both side edges. The slip (24) on one floor member (10) is contiguous with a closely-confronted side (16) or lip (26) of an adjacent floor member (10') when the floor members (10, 10') are installed. The lips (24, 26) form a narrow, material-excluding gap (28) between the floor members (10, 10'). An elongated seal strip (38) having a base portion (40) received in and retained by a longitudinal seal-retaining groove (30) formed in a side (14) of a floor member (10) is provided between each pair of adjacent floor members (10, 10'). A longitudinally straight, vertically convex side surface (36) may be provided vertically above the retaining groove (30) to bias the seal strip (38) into contact with a side surface (48) of an adjacent floor member (10').

13 Claims, 2 Drawing Sheets

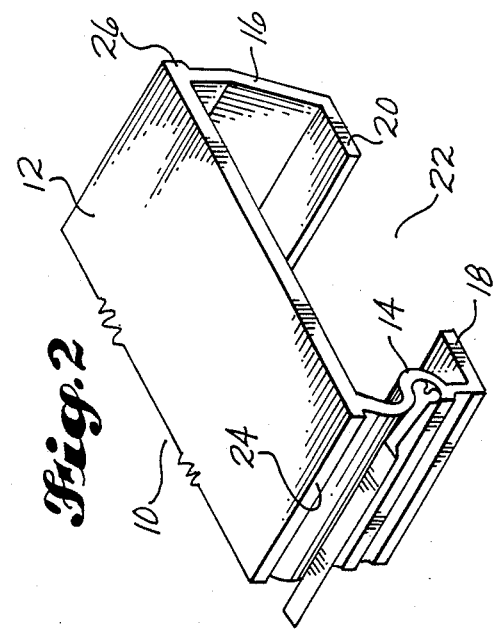
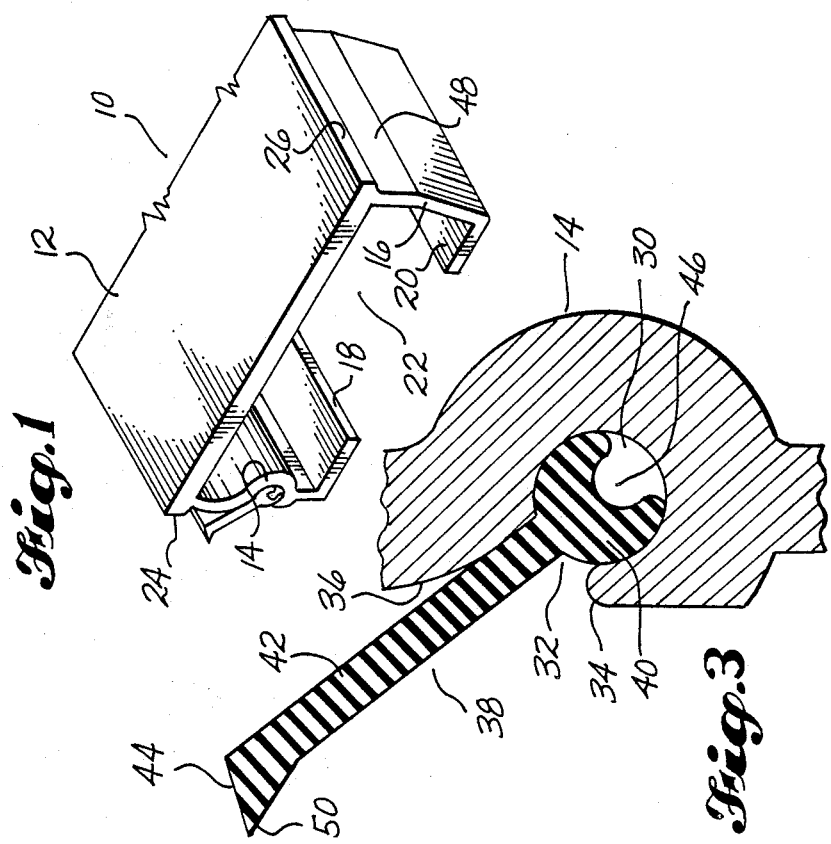

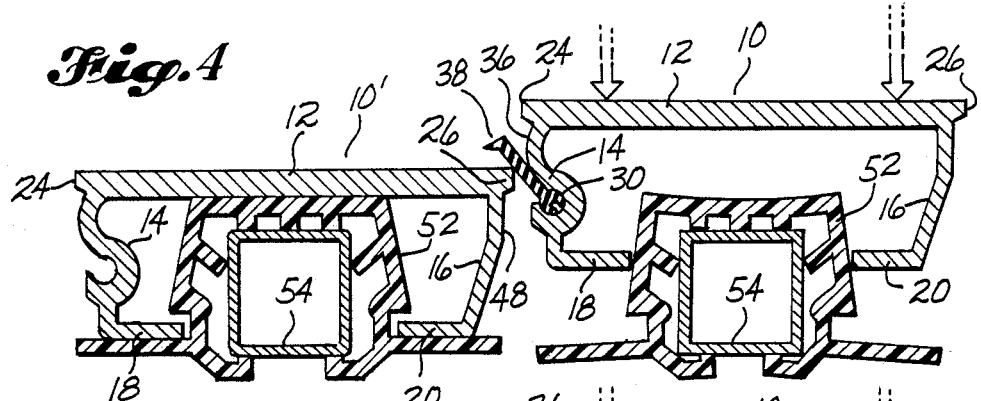
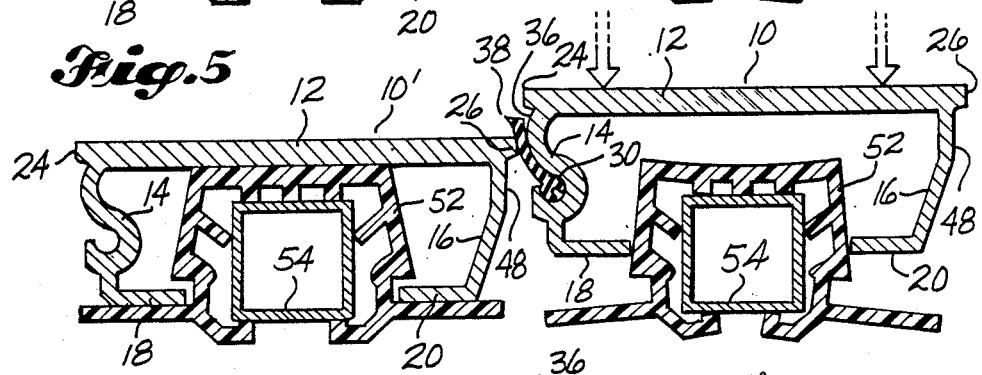
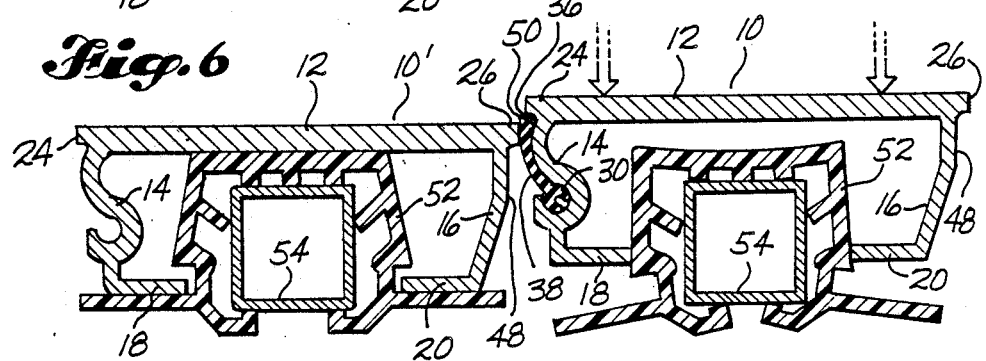
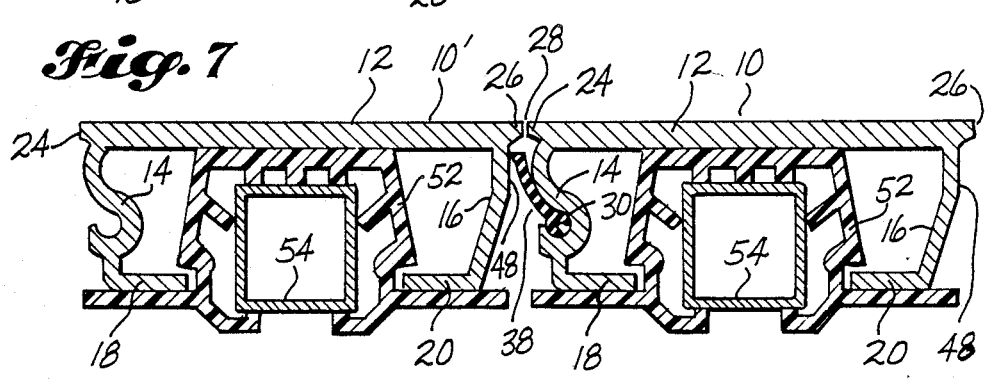

4,896,761

RECIPROCATING CONVEYOR FLOOR MEMBERS AND SEALS

RELATED APPLICATIONS

This application is a continuation-in-part of my co-pending application, Ser. No. 07/346,784, filed May 3, 1989, which is a continuation-in-part of my co-pending application Ser. No. 07/185,840 filed Apr. 25, 1988, now U.S. Pat. No. 4,858,748 which is a division of Ser. No. 07/059,376 filed June 4, 1987 now U.S. Pat. No. 4,785,929, issued Nov. 22, 1988, and a continuation-in-part of Ser. No. 06/680,069 filed Dec. 10, 1984 now U.S. Pat. No. 4,679,686, issued July 14, 1987, which is a continuation-in-part of Ser. No. 06/346,865 filed Feb. 8, 1982 now U.S. Pat. No. 4,492,303, issued Jan. 8, 1985.

DESCRIPTION

1. Technical Field

This invention relates to reciprocating floor conveyors having elastomeric seals between adjacent floor members. More particularly, it relates to the provision of upper side lips on the floor members which define material excluding gaps between the floor members above the elastomeric seals.

2. Background Art

Simple seal strips between adjacent floor members of a reciprocating floor conveyor have been well known and in use for many years. U.S. Pat. No. 4,144,963, issued to Olaf A. Hallstrom Mar. 20, 1979, discloses an elongated strip of flexible material secured removably to one side of each floor member by forming the strip with a laterally projecting dove-tail section and providing a corresponding vertical sidewall of a floor member with a matching dove-tail groove near its top edge. A thin upper fin portion of the strip extends angularly upward and outward to contact the confronting vertical side of an adjacent floor member near its upper edge. A similarly-constructed seal is disclosed in my U.S. Pat. No. 4,492,303, issued Jan. 8, 1985.

These seal strips can be vulnerable to damage or excessive wear when abrasive loads or debris, such as garbage, is carried on the conveyor. If the seal is gouged, torn, or displaced, it will fail to perform its function of excluding load material from sifting downwardly between floor members.

Heretofore, there has been no effective way of protecting the seals from abrasive debris carried in the load on the conveyor. Likewise, it has not previously been possible to move the edges of the floor members closely together and still retain a flexible seal therebetween to make the conveyor effectively nonporous to liquids seeping from the load.

DISCLOSURE OF THE INVENTION

The present invention provides a reciprocating floor conveyor having first and second floor members which, when installed, extend side by side. Each floor member has a top and first and second opposite sides. The first side of a first floor member closely confronts the second side of a second floor member when the floor members are installed. The top of each member may include a side lip overhanging either or both sides of the floor member. The lip on one floor member is contiguous the closely-confronted side or lip on the other floor member when the floor members are installed. The lips form a narrow, material-excluding gap between the floor members.

The first side of the first floor member includes a longitudinal seal-retaining groove spaced downwardly from the top. The second side of the second floor member includes a side surface which confronts and is laterally spaced from the first side of the first floor member when the floor members are installed. An elongated seal strip is provided which has a base portion received in and retained by the retaining groove and an outboard portion projecting from the base portion out from the groove to a free edge. The outboard portion of the seal strip has sufficient resilient stiffness that, following installation of the first floor member, the free edge of the seal strip will spring away from the first side of the first floor member into a position against the side surface of the second floor member. The resilient stiffness will bias the free edge of the seal strip into contact with the side surface of the second floor member.

In this manner, a continuous seal is provided the full length of each floor member to seal the gap between adjacent floor members. The overhanging lip(s) of adjacent floor members serve to exclude the passage of material between floor, members and to protect the seal strip from damage.

The first side of the first floor member may also include a longitudinally straight, vertically convex side surface located vertically above the retailing groove. The convex surface will allow the seal to be deflected during installation and, therefore, will tend to "load" the seal, thereby biasing it into contact with the side surface of the second floor member.

BRIEF DESCRIPTION OF THE DRAWINGS

Like reference numerals are used to indicate like parts throughout the various figures of the drawing, and FIG. 1 is a fragmentary pictorial view of an end portion of a floor member and seal strip according to the preferred embodiment of the invention;

FIG. 2 is a fragmentary pictorial view showing the opposite side of that shown in FIG. 1;

FIG. 3 is a fragmentary cross-sectional view of a seal strip positioned in a longitudinal retaining groove;

FIG. 4 is a cross-sectional view showing a pair of adjacent floor members being installed with a first floor member being downwardly moved into position adjacent a second floor member;

FIG. 5 is a view similar to FIG. 4 with the first floor member further installed and the seal strip being deflected by the second lip of the second floor member;

FIG. 6 is a view similar to FIG. 5, wherein the first floor member is further installed and the free edge of the seal strip is being deflected to a position beneath the first lip on the first floor member; and FIG. 7 is a cross-sectional view of a pair of fully installed floor members according to the preferred embodiment of the invention showing the installed position of the seal strip and floor member lips.

BEST MODE FOR CARRYING OUT THE INVENTION

My U.S. Pat No. 4,821,868, which issued Apr. 18, 1989, and is entitled, "Drive/Frame Assembly for a Reciprocating Floor," discloses a presently-preferred embodiment of a reciprocating floor conveyor. My U.S. Pat. No. 4,492,303, issued Jan. 8, 1985, and entitled, "Drive/Guide System for a Reciprocating Floor Conveyor," discloses a preferred support and guide frame construction for floor members. Longitudinal floor members are connected to transverse drive beams which reciprocate back and forth longitudinally of the floor within a relatively small space. Transverse drive beams for the floor members are positioned on both sides of this space. The longitudinal guide members are supported on and connected to transverse support beams. Plastic slide bearings are secured to the guide beams at locations where the guide beams set down on the transverse support beams. My U.S. Pat. No. 4,679,686, issued July 14, 1987, and entitled, "Bearing System for Reciprocating Floor Conveyor," discloses plastic slide bearings which are constructed to be snapped into place on the longitudinal guide beams and which are constructed to allow the floor members to be snapped into place from above. The contents of U.S. Pat. No. 4,821,868; U.S. Pat. No. 4,492,303; and U.S. Pat. No. 4,679,686 are hereby expressly incorporated into this application by this specific reference.

As disclosed in the above-referenced patents, the floor members of a reciprocating floor conveyor are moved in one direction to advance a load, and are retracted in the opposite direction. Each discloses a reciprocating floor conveyor in which the floor members are divided into three sets. All of the floor members are moved in the first direction to advance the load. They are retracted one set at a time until all floor members are at a start position. The operation is then repeated.

These features of a reciprocating floor conveyor are well known. The present invention is directed to a floor member construction which provides a laterally-extending lip on one or both confronting sides of adjacent floor members to exclude particulate debris carried on the floor from sifting between floor members and to provide protection to an elastomeric seal located beneath these lips.

Referring to the several figures of the drawing and first to FIGS. 1 and 2, therein is shown a portion of a longitudinal floor member 10 according to the preferred embodiment of the invention. Each floor member 10 includes a top panel 12, a pair of opposite, downwardly-extending sides, 14, 16, and a pair of opposite, inwardly-directed flange portions 18, 20 which define a space 22 therebetween.

Laterally extending from the top 12 are first and second lips 24, 26. The first lip 24 is located at the junction of the first side 14 and the top panel 12 and extends along the entire length of the floor member 10. The second lip 26 is located at the junction of the second side 16 and the top panel 12, and also extends along the entire length of the floor member 10.

Referring also to FIG. 7, therein is shown in crosssection, a pair of floor members 10, 10' in a side-by-side installed position. The first side 14 of the first floor member 10 closely confronts the second side 16 of the second floor member 10'. The first lip 24 on the first floor member 10 is contiguous the second lip 26 on the second floor member 10'. In the installed position, these lips 24, 26 form a narrow, material-excluding gap 28 therebetween.

The first side 14 of the first floor member 10 includes a longitudinal seal-retaining groove 30 spaced downwardly from the top 12. Referring now also to FIG. 3, the groove 30 is substantially circular in cross-section and includes a longitudinal opening 32 located outwardly from a vertical center of the groove 30 and upwardly from a horizontal center of the groove 30. The opening 32 is defined substantially between an outward wall portion 34 and the outer surface 36 of the side 14 above the groove 30. The groove 30 may be formed in any desired shape which provides a dovetail-type constricted opening.

An elongated seal strip 38 is provided which has an inboard base portion 40 which is shaped to be received in and retained by the retaining groove 30. Extending outwardly from the base portion 40 is an outboard portion 42. The outboard portion 42 extends through the opening 32 of the retaining groove 30 to a free edge 44.

For ease of insertion of the seal strip 38 into the retaining groove 30, the base portion 40, which is otherwise shaped to conform in cross-section with that of the retaining groove 30, may include a longitudinal notch 46. The notch 46 allows the base portion 40 to be slightly resiliently compressed for ease in sliding the base portion 40 into the retaining groove 30. Any compression of the base portion 40, however, is not sufficient to allow it to be released through the groove opening 32. Because the base portion 40 of the seal strip 38 is longitudinally slid into place in the retaining groove 30 of floor members 10, and because the floor members 10 and seal strips 38 may be forty feet or more in length, a significant amount of friction will be encountered if the base portion 40 is not allowed to be slightly compressible. As stated above, the base portion 40 otherwise substantially conforms in crosssection with that of the retaining groove 30 so that the seal strip 38 is firmly retained in place.

The second side 16 of the second floor member 10' includes a side surface 48 below the second lip 26. The free edge 44 of the seal strip 38 maintains sealing contact with this side surface 48 when the floor members 10, 10' are installed in their side-by-side position. The free edge 44 of the seal 48 may include an enlarged lip portion 50 to assure, continuous sealing contact with the second side surface 48 and to provide increased wearability.

According to another aspect of the invention, the first side 14 of the first floor member 10 may also include a longitudinally straight vertically convex side surface 36 located vertically between the retaining groove 30 and the first lip 24. The convex surface 36 is constructed to place the outboard portion 42 of the seal strip 38 into a loaded condition when the floor members 10, 10' are in their installed position. The seal strip 38 has sufficient resilient stiffness or spring energy that following installation of the first floor member 10, the free edge 44 of the seal strip 38 will spring away from the convex surface 36 and into a position against the second side surface 48 below the second lip 26. The resilient stiffness of the seal strip 38 will cause the free edge 44 to remain biased into sealing contact with the second side surface 48 despite slight lateral movement or shifting of adjacent floor members 10, 10'.

The floor members 10, 10' may be made to be installed by a downward, "snap-on" movement. This installation procedure is shown sequentially in FIGS. 4–7. As disclosed in my above-identified prior patents, each floor member 10, 10' may be downwardly snapped onto a slide bearing 52 which is mounted on one or more longitudinal guide beam(s) 54. Accordingly, the first floor member 10 is constructed to be installed after the second floor member 10'. Additional similarly-constructed floor members may be sequentially installed thereafter. This order of installation allows the seal strip 38 to remain in a substantially upright position between adjacent installed floor members 10, 10' and smoothly pass by the lip 26 on the adjacent floor member 10'.

As shown in FIG. 4, the first floor member 10 is first positioned with its flange portions 18, 20 in contact with and above a slide bearing 52. In this position, the outboard portion 42 of the seal strip 38 extends upwardly and outwardly away from the convex side surface 36 on the first side 14 of the first floor member 10. The second lip 26 of the second floor member 10' will initially contact the outboard portion 42 of the seal strip 38. Referring to FIG. 5, as the first floor member 10 is moved downwardly onto the slide bearing 52 and support beam 54, the outboard portion 42 of the seal strip 38 is deflected upwardly and inwardly toward the convex side surface 36. The convex side surface 36 should be sized and shaped to allow the outboard portion 42 of the seal strip 38 to have sufficient space to pass between the second lip 26 of the second floor member 10' and the convex side surface 36 of the first floor member 10.

Referring now to FIG. 6, as the first floor member 10 is further moved downwardly into position on the bearing 52, the outboard portion 42 of the seal strip 38 is further deflected by the second lip 26 of the second floor member 10' into contact with the side surface 36. The outboard portion 42 of the seal strip 38 is sized to have a width less than the vertical length of the convex side surface 36. In this manner, the enlarged lip portion 50 of the free edge 44 may be safely deflected to a position beneath the first lip 24 of the first floor member 10 as it passes the second lip 26 of the second floor member 10'.

Referring now also to FIG. 7, as the free edge 44 of the seal strip 38 passes below the second lip 26 of the second floor member 10', it has sufficient resilient stiffness to move into a position contacting the second side surface 48 of the second floor member 10' below its second lip 26. Because an inner part of the outboard portion 42 of the seal strip 38 remains in contact with and partially flexed around the convex side surface 36, the free edge 44 is biased into firm and continuous contact with the second side surface 48. The outboard portion 42 remains in this "loaded" condition despite slight lateral shifting of adjacent floor members 10, 10'.

The resulting gap 28 between the first lip 24 of a first floor member 10 and a second lip 26 of a second floor member 10' is small enough to exclude substantially all particulate debris from the load carried above the conveyor's floor. Seepage of liquids or extremely fine particles is prevented by the seal strip 38 which bridges the gap between the first side 14 of the first floor member 10 and the second side 16 of the second floor member 10'. The first and second lips 24, 26, which are made of the same material as the floor member 10, 10' (typically extruded aluminum) are rigid and durable, and thereby protect the seal strip 38 from abrasive debris carried in the load above the floor. Any particulate matter which may pass through the gap 28 will tend to pack between the outboard portion 42 of the seal strip 38 and the convex side surface 36, thereby further biasing the seal strip 38 into contact with the side surface 48 of the adjacent floor member 10', rather than having a destructive affect on the seal strip 38 or working its way between the seal strip 38 and second side surface 48.

Various modifications could be made to the above-disclosed and illustrated embodiment in the practice of my invention. For example, a wider lip could be formed on only one side of each floor member, thereby providing the desired narrow, material-excluding gap and providing protection to the seal strip below. Changes could be made to the shape of the first side surface 36 between the retaining groove 30 and first lip 24. The particular shape of the retaining groove and base portion 40 of the seal strip could be varied as desired to limit movement or flex of the seal strip 38. Although considered desirable, the floor members 10, 10' need not be installed by sequential, snap-down movements. The floor members 10, 10' could be installed in any order by longitudinally sliding them onto bearings 52 and guide beams 54.

Because, these and other variations in the design of the floor members or seal strips may be made without departing from the spirit and scope of my invention, I do not intend that my patent protection be limited to the above-disclosed embodiments which are the best currently-known mode of practicing my invention, but rather I intend that any patent protection granted to me be defined by the appended claim or claims as interpreted by accepted doctrines of claim interpretation, including the doctrine of equivalents.

What is claimed is:

1. A reciprocating floor conveyor, comprising:
first and second floor members which, when installed, extend side by side, each floor member having a top and first and second downwardly depending opposite sides, with the first side of a first floor member closely confronting the second side of a second floor member when the floor members are installed;
said top of each of said first and second floor members including a side lip overhanging one of said first and second sides;
said lip being contiguous with the closely confronted side of the other floor member when the floor members are installed to form a narrow material-excluding gap between the lip of one floor member and the closely confronted side of the other floor member;
said first side of said first floor member including a longitudinal seal-retaining groove spaced downwardly from said top;
said second side of said second floor member including a side surface laterally spaced from the first side of the first floor member when the floor members are installed;
an elongated seal strip having an inboard base portion received in and retained by the retaining groove, and an outboard portion projecting from said base portion outwardly from said groove to a free edge; and
said outboard portion of the seal strip being positioned substantially below said lip and having sufficient resilient stiffness that said free edge is biased into contact with said second side surface of the second floor member.

2. A reciprocating floor conveyor according to claim 1, wherein said lip overhangs said first side.

3. A reciprocating floor conveyor according to claim 1, wherein said lip overhangs said second side.

4. A reciprocating floor conveyor according to claim 1, wherein said first floor member is adapted to be installed after the second floor member is installed by a downward movement of said first floor member.

5. A reciprocating floor conveyor according to claim 1, wherein said first side of said first floor member includes a longitudinally straight vertically convex side surface located vertically between said seal-retaining groove and the top of said first floor member.

6. A reciprocating floor conveyor according to claim 5, wherein said first floor member is adapted to be installed after the second floor member is installed by a downward movement of said first floor member.

7. A reciprocating floor conveyor, comprising:
first and second floor members which, when installed, extend side, by side, each floor member having a top and first and second opposite sides, with the first side of a first floor member closely confronting the second side of a second floor member when the floor members are installed;
said first floor member being adapted to be installed after the second floor member is installed by a downward movement of said first floor member;
said top of said first floor member including a first side lip overhanging the first side of the first floor member;
said top of said second floor member including a second side lip overhanging the second side of the second floor member;
said first lip on said first floor member being contiguous the second lip on the second floor member when the floor members are installed to form a narrow material excluding gap between the lips;
said first side of said first floor member including a longitudinal seal-retaining groove spaced downwardly from said top;
said second side of said second floor member including a side surface below the second lip which confronts and is laterally spaced from the first side of the first floor member when the floor members are installed;
an elongated seal strip having an inboard base portion received in and retained by the retaining groove, and an outboard portion projecting from said base portion out from said groove, said outboard portion having a free edge;
said second lip on said second floor member being positioned such that when the first floor member is moved vertically downwardly into its installed position, the second lip on the second floor member will contact the outboard portion of the seal strip and bend it toward and against the first side of the first floor member below said first side lip; and
said outboard portion of the seal strip having sufficient resilient stiffness that following installation of the first floor member, the free edge of said seal strip will spring away from the first side of the first floor member into a position against the side surface of the second floor member below the second lip and said resilient stiffness will bias the edge of the seal strip into contact with the second side surface of the second floor member.

8. A reciprocating floor conveyor according to claim 7, wherein said first side of said first floor member further includes a longitudinally straight vertically convex side surface located vertically between said seal-retaining groove and said first lip, said convex surface being laterally spaced from said second side surface when the floor members are installed.

9. A reciprocating floor conveyor according to claim 8, wherein said outboard portion of said seal strip has a width less than the vertical length of said convex surface and said outboard portion being bent toward and against the convex surface of the first floor member by the second lip on the second floor member as said first floor member is moved vertically downwardly into its installed position, said free edge of said seal strip being biased into contact with the side surface of the second floor member by a resilient loading of said outboard portion by the outboard portion's contact with said convex surface.

10. A reciprocating floor conveyor according to claim 9, wherein said longitudinal seal-retaining groove is substantially circular in cross-section and includes a longitudinal opening located outwardly from a vertical center of said groove and upwardly from a horizontal center of said groove, said opening being defined substantially between an outward wall portion and said convex side surface.

11. A reciprocating floor conveyor, comprising:
first and second floor members which, when installed, extend side by side, each floor member having a top and first and second opposite sides, with the first side of the first floor member closely confronting the second side of a second floor member when the floor members are installed;
said top of said first floor member including a first side lip overhanging the first side of the first floor member;
said top of said second floor member including a second side lip overhanging the second side of the second floor member;
said first lip on said first floor member being contiguous the second lip on the second floor member when the floor members are installed to form a narrow material-excluding gap between the lips;
said first side of said first floor member including a longitudinal seal-retaining groove spaced downwardly from said top;
said second side of said second floor member including a side surface below the second lip which confronts and is laterally spaced from a side surface on the first side of the first floor member when the floor members are installed;
an elongated seal strip having an inboard base portion received in and retained by the retaining groove, and an outboard portion projecting from said base portion out from said groove to a free edge;
said outboard position of the seal strip having sufficient resilient stiffness that following installation of the floor members, the free edge of said seal strip will be biased into contact with said side surface of the second floor member.

12. A reciprocating floor conveyor according to claim 11, wherein said first side of said first floor member further includes a longitudinally straight vertically convex side surface located vertically between said seal-retaining groove and said first lip, said convex surface being laterally spaced from said second side surface when the floor members are installed.

13. A reciprocating floor conveyor, comprising:
first and second floor members which, when installed, extend side by side, each floor member having a top and first and second opposite sides, with the first side of a first floor member closely confronting the second side of a second floor member when the floor members are installed;
said first floor member being adapted to be installed after the second floor member is installed by a downward movement of said first floor member;
said top of said first floor member including a first side lip overhanging the first side of the first floor member;

said top of said second floor member including a second side lip overhanging the second side of the second floor member;

said first lip on said first floor member being contiguous the second lip on the second floor member when the floor members are installed to form a narrow material-excluding gap between the lips;

said first side of said first floor member including a longitudinal seal-retaining groove spaced downwardly from said top, and a longitudinally straight vertically convex side surface located :vertically between said groove and said first lip;

said second side of said second floor member including a side surface below the second lip which confronts and is laterally spaced from the convex surface on the first side of the first floor member when the floor members are installed;

an elongated seal strip having an inboard base portion received in and retained by the retaining groove, and an outboard portion projecting from said base portion out from said groove, said outboard portion having a free edge and a width less than the vertical length of said convex surface;

said second lip on said second floor member being positioned such that when the first floor member is moved vertically downwardly into its installed position, the second lip on the second floor member will contact the outboard portion of the seal strip and bend it toward and against the convex surface of the first floor member; and said outboard portion of the seal strip having sufficient resilient stiffness that following installation of the first floor member, the free edge of said seal strip will spring away from the convex surface of the first floor member into a position against the side surface of the second floor member below said second lip and said resilient stiffness will bias the free edge of the seal strip into contact with said side surface of the second floor member.

* * * * *

UNITED STATES PATENT AND TRADEMARK OFFICE
CERTIFICATE OF CORRECTION

PATENT NO. : 4,896,761

DATED : January 30, 1990

INVENTOR(S) : Raymond Keith Foster

It is certified that error appears in the above-identified patent and that said Letters Patent is hereby corrected as shown below:

In the fourth line of the Abstract, "slip" should be -- lip --.

Col. 2, line 24, delete the comma after "floor".

Col. 2, line 28, "retailing" should be -- retaining --.

Col. 3, line 52, "crosssec-" should be hyphenated after "cross".

Col. 3, line 56, "10'.The" should be -- 10'. The --.

Col. 3, line 58, "10'.In" should be -- 10'. In --.

Col. 4, line 27, "crosssection" should be -- cross-section --.

UNITED STATES PATENT AND TRADEMARK OFFICE
CERTIFICATE OF CORRECTION

PATENT NO. : 4,896,761

DATED : January 30, 1990

INVENTOR(S) : Raymond Keith Foster

It is certified that error appears in the above-identified patent and that said Letters Patent is hereby corrected as shown below:

Col. 4, line 36, delete the comma after "assure".

Col. 4, line 40, insert a comma after "straight".

Col. 4, ln. 63, "10'.Additional" should be -- 10.' Additional -

Col. 6, line 11, delete the comma after "because".

Claim 7, col. 7, line 7, delete the comma after "side", first occurrence.

Claim 11, col. 8, line 43, "position " should be -- portion --.

Claim 13, col. 9, line 11, delete the colon before "vertically".

Signed and Sealed this

Nineteenth Day of November, 1991

Attest:

HARRY F. MANBECK, JR.

*Attesting Officer*     *Commissioner of Patents and Trademarks*